Patented Oct. 17, 1922.

1,432,422

UNITED STATES PATENT OFFICE.

MAX STAHL, OF CHICAGO, ILLINOIS, ASSIGNOR TO WAHL-HENIUS INSTITUTE, OF CHICAGO, ILLINOIS, A CORPORATION OF ILLINOIS.

ART OF PRODUCING LOW-ALCOHOLIC BEER.

No Drawing. Application filed April 1, 1918. Serial No. 226,072.

*To all whom it may concern:*

Be it known that I, MAX STAHL, a citizen of the United States, residing at 5427 Greenwood Avenue, Chicago, in the county of Cook and State of Illinois, have invented a new and useful Art of Producing Low-Alcoholic Beer, of which the following is a specification.

My present invention relates to the art of producing beer and will be fully understood from the following specification.

The particular object of my invention is to provide a procedure by which there may be produced a high-grade beer of an alcoholic content lower than standard beer and with an accompanying substantial saving in the materials employed as well as in the fuel required.

Although it has been the practice to employ the word "beer" as descriptive of a wide variety of hopped and carbonated fermented beverages prepared from cereals or cereal products, it may be said that a standard beer is represented by a beverage of this type having an alcoholic content by weight of approximately $3\frac{1}{2}$ per cent, but which may vary from 3 per cent upwards. The more important steps of procedure, the choice of materials, and even the minor features of technique in the brewing of such standard beer, have become matters of general knowledge and are substantially the same throughout the industry.

It is one of the more important objects of my invention to provide a process attaining the above-mentioned primary object with a minimum departure from this present satisfactory status of the art of brewing standard beer.

I further propose to attain an improvement in the taste and foam-holding capacity of the beer without departing from what may be said to be the identifying characteristics or properties of any particular standard product. Among the other objects and advantages of my invention the following may be mentioned:

The continued advantageous use of the present standard brewery equipment and without the requirement of adding any material proportion of extra equipment; a reduction in the shrinkage of the product during manufacture; the maintenance of the strain of the yeast and the quality (flavor) of the gas of any particular standard beer; and an increase in the productive capacity of the brewery with the same cellar equipment, resulting in a greater return on the capital invested in the plant.

In general, it may be stated that the above mentioned objects and advantages are attained by a brewing method which involves, first, the continued production substantially as before of a reduced proportion of the standard brew of any particular brewery; second, the use of the surplus equipment capacity for the production of a special brew of low gravity beer prepared as hereafter set forth; third, by the use of lactic acid; and, fourth, by mixing the standard or basic brew and the special low gravity brew in the required proportions to obtain the final product.

The diluent, if it be of low enough alcoholic content to serve as an effective diluent, will not contain as high a proportion of lactic acid as standard beer. The finished mixed beer will, for this reason, differ more from the standpoint of palatability, flavor or taste from a true beer than if it had a normal lactic acid content. In general, it may be said that the lactic acid content increases with the alcoholic content, the increase being in the same direction, although not strictly proportional. Thus, the average lactic acid content of standard beers may be said to be about .05 per cent., whereas the acid content of low gravity checked fermentation products will come closer to .025 per cent.

I have discovered that by carrying out the dilution of the standard brew, preferably with the special brew hereafter to be described, and by the use of lactic acid in the required amounts, it is possible to obtain a finished product which, while lower in alcohol than a standard beer, will nevertheless retain the zest of a standard brew, the lactic acid being apparently responsible in large part for this characteristic palate effect.

The lactic acid may be added at various stages of the process but what I consider to be the best method is to add the acid to the special low gravity brew, the preferred acid product being a lactic acid liquor of about 2.4 per cent acidity produced according to the process described in the United States patent to Wahl, No. 979,810 of December 27, 1910. The amount of such acid or acid liquor added will obviously depend upon the particular process of manufacture employed. In all cases, the amount of acid added should be sufficient to bring the acid content of the final mixed product up to at least approximately .05 per cent. In the specific process to be hereafter described, this result is obtained by the use of about 2¼ barrels of the 2.4 per cent acid liquor per 100 barrels of low gravity special brew.

In order to attain the full benefits of my invention, I prefer to employ as a diluent for the standard beer a special brew prepared in the following manner:

Materials.

The materials required for 100 barrels of the special brew of 5% Balling are as follows:

Malt (laboratory yield 69%) about 2000 lbs;

Hops 50 to 75 lbs;

Lactic liquor (about 2.4% acid) about 2¼ bbls.

The method of production may best be described by reference to the several stages of the process as follows:

Cooker.

About 40% of the malt ground as fine as practicable is doughed in with about one barrel of water per 100 lbs., this water, if soft, being preferably hardened with a burtonizing salt, for instance gypsum; about 5 gallons of lactic liquor is added. The temperature of the mash should be about 37.5° C. The mashing is conducted for 20 minutes and then the temperature raised as rapidly as possible to boiling. After boiling for 15 minutes it is run down as quickly as possible into the malt mash.

Mash-tun.

15 to 30 minutes before the cooker mash is started dough in 60 per cent of the malt ground as fine as practicable with one barrel of water of 43.5° C. to 100 lbs. of malt, this water, if soft, being likewise preferably hardened by the addition of a burtonizing salt; about 10 gallons of the lactic liquor is now added, the mashing proceeded with for about 5 minutes and then the mash permitted to rest until the cooker mash is finished. The cooker mash heretofore referred to is then run down as rapidly as possible, raising the temperature in the mash-tun from 50° to 75° C. the temperature having been first raised to 50° C. with steam. If the cooker mash fails to bring the temperature in the mash-tun up to this 75° C., steam should be used. The mashing is now proceeded with until inversion has taken place, which should require only a few minutes. The temperature should, under no circumstances, fall below 75° C. When complete inversion (no starch) is shown by iodine test, the taps are opened and the mash pumped back while the machine is kept running. After a few minutes the machine may be stopped, the mash permitted to rest from 15 to 30 minutes, and then tapped as usual.

Sparging.

The mash is sparged as usual with water of a temperature of 80° C. Sparging is continued until the desired number of barrels are obtained in the kettle. The same precaution should here be observed as to proper hardness of the water.

Kettle.

About 20 to 40 barrels of boiling water are put into the coil before the wort is tapped. When the steam jacket or kettle is covered sufficient live steam is cut in to keep the temperature of the wort at 93° C., while running the wort in and until about half an hour before the kettle is filled, at which time the wort is to be brought to a boil. During the boiling and filling of the kettle, about two-fifths of the hops are added in two equal fractions, the boiling being continued for from one-half to three-quarters of an hour thereafter. There should now be added to the wort in the kettle about 1¾ barrels of the lactic liquor, together with the desired quantity of salt, any proper coloring material, and washed yeast. Boiling is continued for 15 minutes, the remainder of the hops is added, and the wort run into the hop-jack.

Hops-sparging.

The hops should be sparged with about 7½ barrels of boiling water per 100 barrels of wort, preferably in three equal portions. The exact amount of sparging water should be sufficient to bring the gravity of the wort in the cellar to 5% Balling.

Cooling and fermentation.

The hopped wort of 8° C. is cooled to 6.5° R. and one-third of a pound of yeast per barrel is added. According to the gravity of the wort and the amount of alcohol desired, the time of fermentation will be from 12 to 48 hours. As soon as the fermented wort shows about 4.5° Balling, run through an enclosed cooler into a pressure cask, reducing the temperature as near to the freezing point (0°C.) as possible.

Pressure cask.

Here the usual amount of finings are used. The beer is left in the pressure cask for at least 24 hours, being kept continuously under a pressure of 10 lbs. It should not be permitted to remain in the pressure cask longer than 48 hours.

Filtering.

After the beer has remained in the pressure cask for the designated time, it is ready for filtering, mixing and carbonating.

The special brew prepared in the manner described above will show approximately .3 to .5 per cent alcohol by weight and 4 to 4.4 per cent extract.

In order to produce a final product containing for example less than 2¾ per cent alcohol by weight, the special brew referred to should be mixed in equal proportions with the standard beer, assuming that the latter has 3.5 per cent alcohol.

This mixing may be accomplished by simultaneously pumping through a Y-connection the standard beer and the special brew, the former being drawn from storage and the latter from the pressure cask. Carbonating should be carried out simultaneously with this mixing operation, being completed in the mixing tank or during racking by any of the well-known forms of carbonators.

It is important that the temperature during all operations in the mixing tank be kept as near the freezing point as possible, so as to prevent further fermentation. Bottle beer or beer for export may be stabilized as usual.

The finished low-alcoholic product, consisting of the mixture of the standard brew and special brew, may be run from the mixing tank, after carbonating therein, either to the racking-room or to any tank or receptacle previous to racking.

With regard to the specific process of producing the special brew for admixture with the standard brew as described above, it is to be particularly noted that second only to the importance of the saving in materials is the very great simplicity of the brewing method and the short-time production. Assuming that the special brew will require the same equipment for the same length of time as to all operations previous to fermentation, it will be noted that as to this and subsequent operations there is a great saving in time, fuel (used for refrigeration) and capacity of equipment. Thus, a standard beer requires ordinarily about ten days for fermentation and about 30 days for storage, if carbonating is employed, giving a total period in the cellar of at least 40 days. As against this, my special brew requires only 1½ to 2 days for fermentation and one to two days in the pressure cask, at the end of which time it is ready for mixing with the finished standard brew.

If in place of carbonating the standard brew is "kraeusened," as is still the practice in many breweries, approximately 30 days longer is consumed in its production. For the separate carbonating of the special brew, under these conditions, three to seven days only will be required.

In order to make apparent the great similarity between the low-alcoholic product produced in accordance with my invention and the standard or basic brew, the following figures will be of interest. The basic brew may be assumed to have the following representative analysis:

Alcohol _____ 3.5 per cent.
Extract _____ 5 per cent.

The special brew prepared as described above will approximate the following analysis:

Alcohol _____ .5 per cent.
Extract _____ 4 per cent.

The low-alcoholic product prepared by the admixture of for instance equal portions of the standard brew and the special brew will have the following analysis:

Alcohol _____ 2 per cent.
Extract _____ 4.5 per cent.

It will be observed from the foregoing that the comparatively great change in the alcohol content has been effected with an accompanying comparatively small change in the extract.

While I have described in considerable detail the theories underlying my invention, the preferred process of carrying out the same and some variants thereof, it will be understood that all of this description is only for the purpose of making my invention more clear, and that my invention is not to be regarded as limited to or based upon any of these theories or peculiarities of procedure, except in so far as the same are included within the terms of the accompanying claims, in which it is my intention to claim all novelty inherent in my process as broadly as is permissible in view of the prior art.

What I claim is:

1. The process of producing a beer which consists in diluting a standard beer with a low-alcoholic fermented brew in such proportions as to reduce the alcohol content of the mixture to the desired extent, the proportion of free lactic acid in the constituents being sufficient to give substantially .05% free acid in the mixture.

2. The process of producing a beer which shall simulate a particular standard brew which consists in preparing such standard brew in its beverage characteristics in the usual manner, preparing a low-alcoholic fermented brew, adding to such product lactic acid in amounts sufficient to raise the percentage of acid therein to .05%, and diluting such standard brew with the low-alcoholic or alcohol-free product thus acidified up to the extent required to reduce the alcohol content of the mixture to the predetermined figure.

3. The process of producing a beer in which the alcoholic content shall not exceed 2.75% by weight, which consists in preparing a beer having a higher content of alcohol, and admixing with such beer at a stage of its production subsequent to fermentation a low-alcoholic checked fermentation product containing an amount of lactic acid substantially the same as the original beer, the dilution being carried out to such an extent as to reduce the alcoholic content of the mixture below 2.75 by weight.

4. The process of producing a beer which consists in preparing a standard brew, and, subsequent to the fermentation of the latter, adding thereto a checked fermentation product having a lactic acid content not substantially below that of the standard brew, the proportion of dilution being sufficient to reduce the alcoholic content of the mixture below 2.75% by weight.

5. The process of producing a beer which consists in preparing a standard brew, and, subsequent to the fermentation of the latter, adding thereto a special brew prepared from a wort of about 5% Balling fermented to about 4.5% B., the proportion of dilution being sufficient to materially reduce the alcoholic content of the standard brew.

6. The process of producing a beer which consists in preparing a standard brew and, subsequent to the fermentation of the latter, adding thereto a special brew prepared from a wort of approximately 5% Balling fermented to approximately 4½% B., the standard brew and the special brew being employed in approximately equal proportions in the mixture.

7. The process of producing a beer which consists in preparing a standard brew and, subsequent to the fermentation of the latter, adding thereto a special brew containing approximately .05% lactic acid prepared from a wort of 5% Balling fermented to approximately 4½% B., the proportion of dilution being sufficient to substantially reduce the alcoholic content of the standard brew.

8. The method of preparing a special brew for use in diluting a standard beer to reduce the alcoholic content thereof without materially altering the other properties of the product which consists in preparing a wort of about 5% Balling and fermenting such wort to about 4½% Balling, free lactic acid being added to the said special brew during its manufacture to such an extent as to raise the acid content thereof to approximately .05%.

MAX STAHL.